(12) United States Patent
Rowley (10) Patent No.: US 7,761,469 B2
(45) Date of Patent: Jul. 20, 2010

(54) STREAMED ATTRIBUTES

(75) Inventor: Peter A. Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 188 days.

(21) Appl. No.: 11/606,450

(22) Filed: Nov. 29, 2006

(65) Prior Publication Data

US 2008/0126295 A1    May 29, 2008

(51) Int. Cl.
G06F 7/00 (2006.01)
(52) U.S. Cl. .................................... 707/781; 709/226
(58) Field of Classification Search .................. 707/9, 707/10, 600, 607–609, 694, 718, 741, 770, 707/771, 781; 709/223, 238
See application file for complete search history.

(56) References Cited

U.S. PATENT DOCUMENTS

| | | | |
|---|---|---|---|
| 6,601,233 B1* | 7/2003 | Underwood | 717/102 |
| 2002/0184368 A1* | 12/2002 | Wang | 709/226 |
| 2003/0231639 A1* | 12/2003 | Mikkola | 370/401 |
| 2004/0199635 A1* | 10/2004 | Ta et al. | 709/226 |
| 2004/0221315 A1* | 11/2004 | Kobayashi | 725/126 |
| 2005/0066085 A1* | 3/2005 | Kobayashi | 710/62 |
| 2005/0117576 A1* | 6/2005 | McDysan et al. | 370/389 |
| 2007/0083655 A1* | 4/2007 | Pedersen | 709/226 |
| 2007/0186212 A1* | 8/2007 | Mazzaferri et al. | 718/1 |

OTHER PUBLICATIONS

Alexander, Megan, "What is LDAP?", http://raleigh.pm.org/ldap-talk.html, Jun. 17, 1999, 16 pages.
"Netscape Directory Server: Administrator's Guide," Oct. 2004, 624 pages, Version 7.0, Netscape Communications Corporation.
"Netscape Directory Server: Installation Guide," Oct. 2004, 124 pages, Version 7.0, Netscape Communications Corporation.
"iPlanet Directory Server: Configuration, Command and File Reference," Dec. 2001, 288 pages, Version 5.1, Sun MicroSystems, Inc.
"iPlanet Directory Server: Deployment Guide," Dec. 2001, 198 pages, Version 5.1, Sun Microsystems, Inc.
"iPlanet Directory Server: Schema Reference," Dec. 2001, 165 pages, Version 5.1, Sun MicroSystems, Inc.
"Netscape Directory Server: Deployment Guide," Oct. 2004, 208 pages, Version 7.0, Netscape Communications Corporation.

(Continued)

Primary Examiner—Wilson Lee
(74) Attorney, Agent, or Firm—Blakely, Sokoloff, Taylor & Zafman LLP (57) ABSTRACT

A method and apparatus for retrieving data from a Lightweight Directory Access Protocol (LDAP) repository. In one embodiment, the method includes receiving a request for at least one LDAP attribute value of an LDAP attribute, the LDAP attribute having a plurality of LDAP attribute values. The method may further include retrieving a first subset of the plurality of LDAP attribute values from an LDAP repository serially, and returning the first subset of the plurality of LDAP attribute values to a requester.

19 Claims, 5 Drawing Sheets

OTHER PUBLICATIONS

"iPlanet Directory Server: Administrator's Guide," Dec. 2001, 568 pages, Version 5.1, Sun MicroSystems, Inc.

"iPlanet Directory Server: Installation Guide," Dec. 2001, 102 pages, Version 5.1, Sun MicroSystems, Inc.

"Netscape Directory Server: Configuration, Command and File Reference," Oct. 2004, 342 pages, Version 7.0, Netscape Communications Corporation.

"Red Hat Directory Server: Configuration, Command and File Reference," May 2005, Updated Aug. 2009, 334 pages, Version 7.1, Red Hat, Inc., Raleigh, North Carolina, U.S.A.

"Red Hat Directory Server: Deployment Guide," May 2005, 230 pages, Version 7.1, Red Hat, Inc., Raleigh, North Carolina, U.S.A.

"Red Hat Directory Server: Administrator's Guide," May 2005, Updated Feb. 2009, 652 pages, Version 7.1, Red Hat, Inc., Raleigh, North Carolina, U.S.A.

"Netscape Directory Server: Plug-in Programmer's Guide," Oct. 2004, 634 pages, Version 7.0, Netscape Communications Corporation.

Weider, et al., "LDAP Control Extension for Simple Paged Results Manipulation," Sep. 1999, pp. 1-7.

* cited by examiner

STREAMED ATTRIBUTES

TECHNICAL FIELD

Embodiments of the present invention relate to handling request for data using a Lightweight Directory Access Protocol (LDAP), and more specifically to streaming attributes in response to LDAP requests.

BACKGROUND

The Light Weight Directory Access Protocol (LDAP) has become very popular due to its efficient and fast data access. A large number of applications/services are currently in use and being developed that utilize an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes and each entry has an objectClass attribute containing named classes defined in the schema. The objectClass attribute may be multivalued and contain the class "top" as well as some number of other classes. The schema definition for each class an entry belongs to defines what kind of object the entry may represent (e.g., a person, organization or domain). Membership in a particular class gives the entry the option of containing one set of attributes (optional attributes) and the obligation of containing another set of attributes (mandatory or required attributes). For example, an entry representing a person might belong to the class "person." Membership in the "person" class would require the entry to contain the "sn" and "cn" attributes and allow the entry also to contain "userPassword," "telephoneNumber" and other attributes.

An LDAP directory server may access specific data items in the LDAP directory in response to a client request. The LDAP server retrieves attributes and entries from the LDAP directory that is stored in the LDAP repository. The attributes are accessed and retrieved in their entirety. As a result, attributes with a large set of values degrade system performance by occupying a large amount of system memory.

BRIEF DESCRIPTION OF THE DRAWINGS

The present invention is illustrated by way of example and not by way of limitation in the figures of the accompanying drawings.

DETAILED DESCRIPTION

Embodiments of the invention provide support for streaming LDAP attributes from the LDAP repository to the LDAP server and to LDAP clients. The embodiments of the method and apparatus include receiving a request for an LDAP attribute and checking to determine if the LDAP attribute is streamable. If the LDAP attribute is streamable, then the values of the attribute may be retrieved incrementally as the requesting LDAP operation or LDAP client is able to handle the attribute values. The requester may thereby throttle the rate at which the attribute values are retrieved. The apparatus and method improve LDAP server performance by reducing the amount of memory utilized when retrieving attributes with large sets of attribute values.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the action and processes of a computer system or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"), random access memory ("RAM"), magnetic disk storage media; optical storage media, flash memory devices or other type of machine-accessible storage media.

Figure 1:
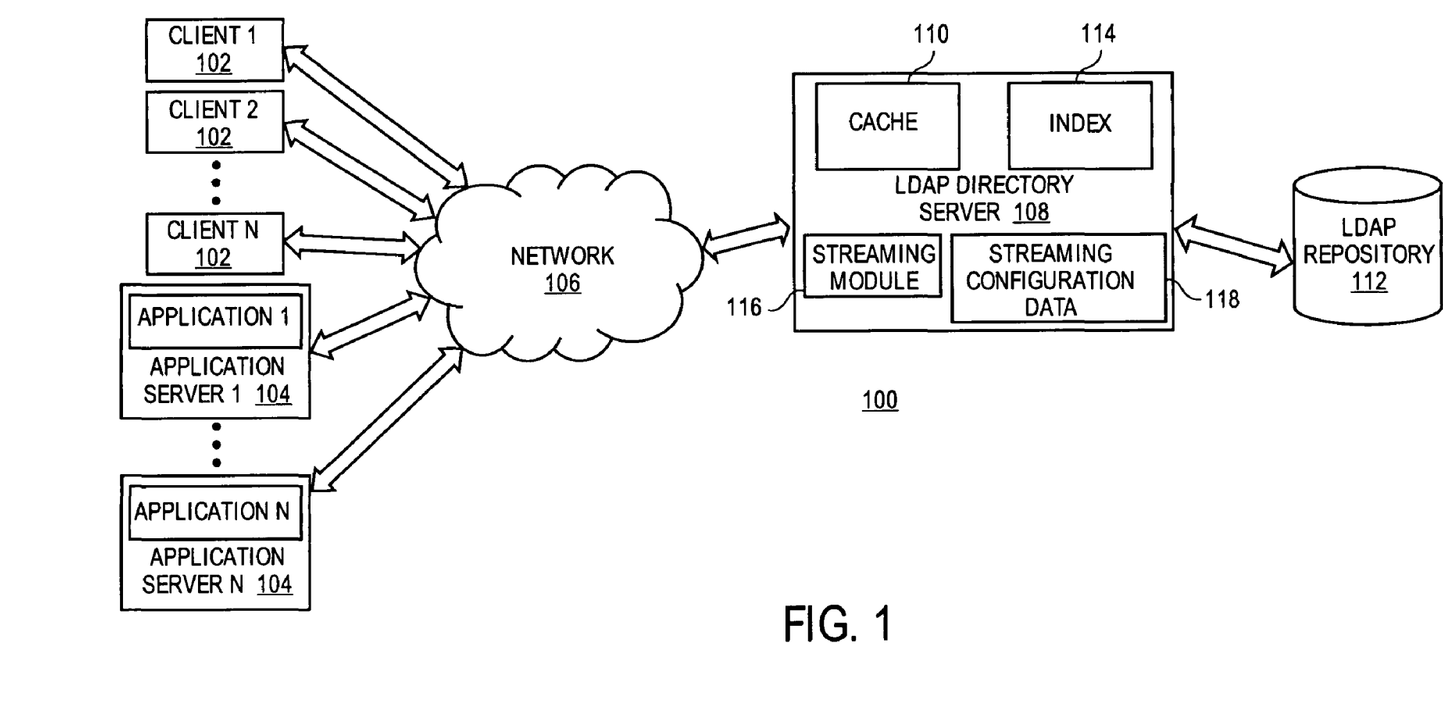
FIG. 1 is a diagram of one embodiment of a network and system including a lightweight directory access protocol (LDAP) server.

FIG. 1 is a diagram of one embodiment of a network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs) or similar devices capable of communicating over the network 106 and running an LDAP client.

The clients 102 are coupled to the LDAP directory server 108 via the network 106, which may be a public network (e.g., Internet) or a private network (e.g., a virtual local area network (VLAN)). The LDAP directory server 108 may contain a server front-end responsible for network communications, plugins or modules for server functions (such as access control and replication), a basic directory tree containing server-related data and a database back-end plugin responsible for managing the storage and retrieval of LDAP repository data.

In one embodiment, the clients 102 communicate with the LDAP directory server 108 via a web server (not shown). For example, the clients 102 may execute web browsers that communicate with the web server using HTWIP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that hosts various applications requesting information from the LDAP directory server 108. The application servers 104 operate as clients in communication with the LDAP directory server 112. Similar to the clients 102, the application servers 104 may communicate with the LDAP directory server 112 directly or via a web server.

The LDAP repository 112 may be part of the LDAP directory server 108 or it may reside externally (e.g., on a database server). The LDAP repository 112 may contain a tree of data entries. The structure of the entries may be specified in the definition of the LDAP repository 112. The definition of the LDAP repository 112 may be represented as a schema, a table or some other data structure and may reside independently or inside the LDAP repository 112. For example, the schema may be included in the LDAP repository 112 as a collection of LDAP repository entries rooted at the base DN cn=schema.

The schema may define object classes and attributes associated with each object class. Each entry in the LDAP repository has an objectClass attribute, containing one or more classes defined in the schema. The schema definition for each class an entry belongs to defines what kind of object the entry may represent (e.g., a person, organization or domain).

In one embodiment, the LDAP server 108 may include a cache 110, an index 114, a streaming module 118, streaming configuration data and similar modules. In other embodiments, these modules may be implemented as plugins or similarly implemented to provide services to the LDAP server 108. The cache 110 may store entry and attribute data recently retrieved from the LDAP repository 112. The cache 110 is utilized to improve the performance of the LDAP server 108 by providing fast access to the data in the cache 110 that is stored in a local memory or similar storage device instead of retrieving the data from the LDAP repository 112, which is typically an external database stored on a set of magnetic disks and slower than the cache 110. The LDAP server 108 may maintain an index 114 or set of indices. The index 114 also improves server performance by storing in local memory or storage devices pointers to frequently accessed entries and attributes. The entries in the index 114 may be set by a system administrator, may have default settings or may be similarly maintained.

A streaming module 118 provides a service to the LDAP server 108 and its clients that allows for the incremental retrieval of attributes from the LDAP repository 112. Attributes may have a large number of values associated with them. For example, an attribute may be stored in the LDAP repository 112 that represents all users in the directory. This may result in tens of thousands of attribute values depending on the size of the organization maintaining the LDAP directory. Conventional LDAP servers retrieve attributes in their entirety and do not provide a function or service to allow the retrieval of a subset of the values of an attribute or to retrieve the attribute values in increments. Consequently, LDAP server performance is degraded when large attributes are accessed due to the large amount of memory that is consumed by the attribute values. The streaming module 118 enables an attribute values to be retrieved incrementally or as a 'streamed' attirbute, where the values of the attribute are send incrementally to the LDAP server and to the requesting client. The LDAP server 108 and client may then operate on the attribute data as it is received. As a result, smaller amounts of system memory are utilized thereby improving overall system performance. The streaming configuration data 118 may be an LDAP entry or similar data structure that defines the characteristics and operation of the streaming module. The streaming configuration data 118 may include stream bit rates, packet sizes, window sizes, streamable attribute indicators and similar data related to streaming attributes.

Figure 2:
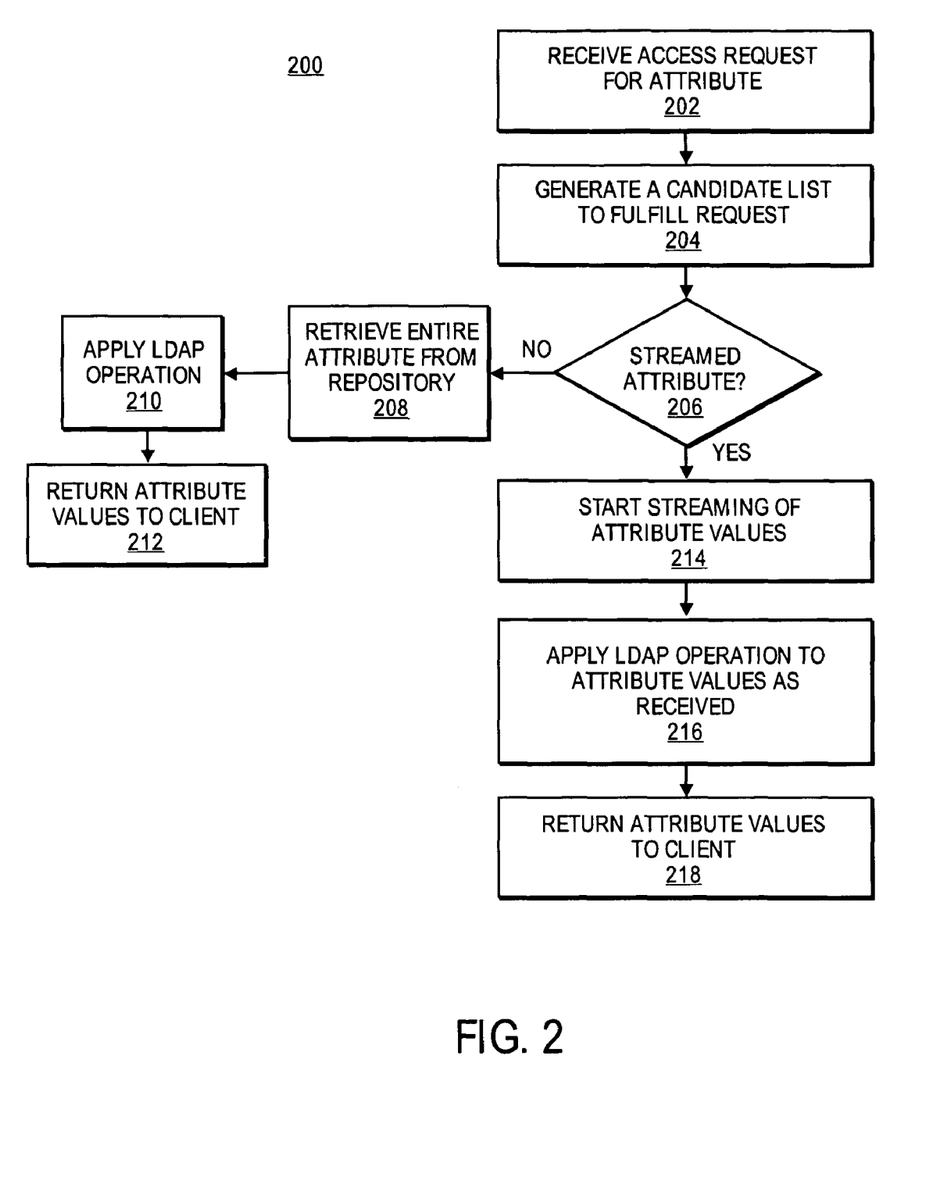
FIG. 2 is a flowchart of one embodiment of a process for servicing requests by an LDAP server.

FIG. 2 is a flowchart of one embodiment of a method 200 for handling LDAP requests. The method may be performed by processing logic that may comprise hardware (e.g., circuitry, dedicated logic, programmable logic, microcode, etc.), software (such as instructions run on a processing device) or a combination thereof. In one embodiment, method 200 is performed by the LDAP directory server 108 of FIG. 1.

Referring to FIG. 2, method 200 begins with processing logic receiving a request pertaining to data in an LDAP repository (block 202). The request may be received from a client, application server or similar entity and may be in the form of a request for a specific entry or attribute that may be retrieved from the LDAP repository and returned to the requesting client. In other cases the request will be in the form of a search, filter or other LDAP operation. For example, a request may be for the user name of all employees in specific divisions of the company, such as the legal and information technology divisions of the the company. This request may be represented as a logical expression or filter: (|(division=legal) (division=IT). The filter may be applied to generate a candidate list of data items that meet the requirements of the search filter (block 204). The candidate list may include a list of data items in the LDAP repository that meet the filter requirements. In the example, all user names for each division may be stored in a single attribute of an entry associated with each division. If the divisions are large, the number of values for the attribute may be very large.

In one embodiment, the server checks to determine if any of the attributes whose values are to be retrieved are streamable (block 206). An attribute may be marked as streamable within an entry, based on the attribute name, in a separate streamable attribute list or through a similar mechanism.

If an attribute whose values are to be retrieved is not streamable, then the standard procedure for retrieving the attribute values will be executed. All of the attribute values will be retrieved from the LDAP repository and placed in working memory of the LDAP server (block 208). After the attribute values are retrieved any further processing or LDAP operations that are to be applied to the retrieved data takes place (block 210). This processing of the retrieved data may include returning requested attribute values to a client or application server that requested the data by sending it over the network (block 212). The requested attribute values are returned in their entirety regardless of whether the requesting client or application server is prepared to process each of the attribute values.

If an attribute whose values will be retrieved from the LDAP repository is determined to be streamable, then the LDAP server starts the process of retrieving the attribute values as a stream of data (block 214). The data may be retrieved in increments, blocks, as individual values or any size group of data. The rate of retrieval may vary depending on the rate of processing by the LDAP server, client or other entity. These characteristics of the streaming process may be determined dynamically, may be set in the streaming configuration data or a combination thereof.

The attribute values may be processed after retrieval based on LDAP operation or similarly processed (block 216). The LDAP operations may be standard LDAP operations or specialized LDAP operations for utilizing streaming data. The retrieved attribute values, after any further processing, may be sent to the requesting client or application server (block 218). The data may be streamed from the LDAP server to the client or application server. The packet and window size may be determined by the network connection, the streaming configuration data or combinations thereof.

Figure 3:
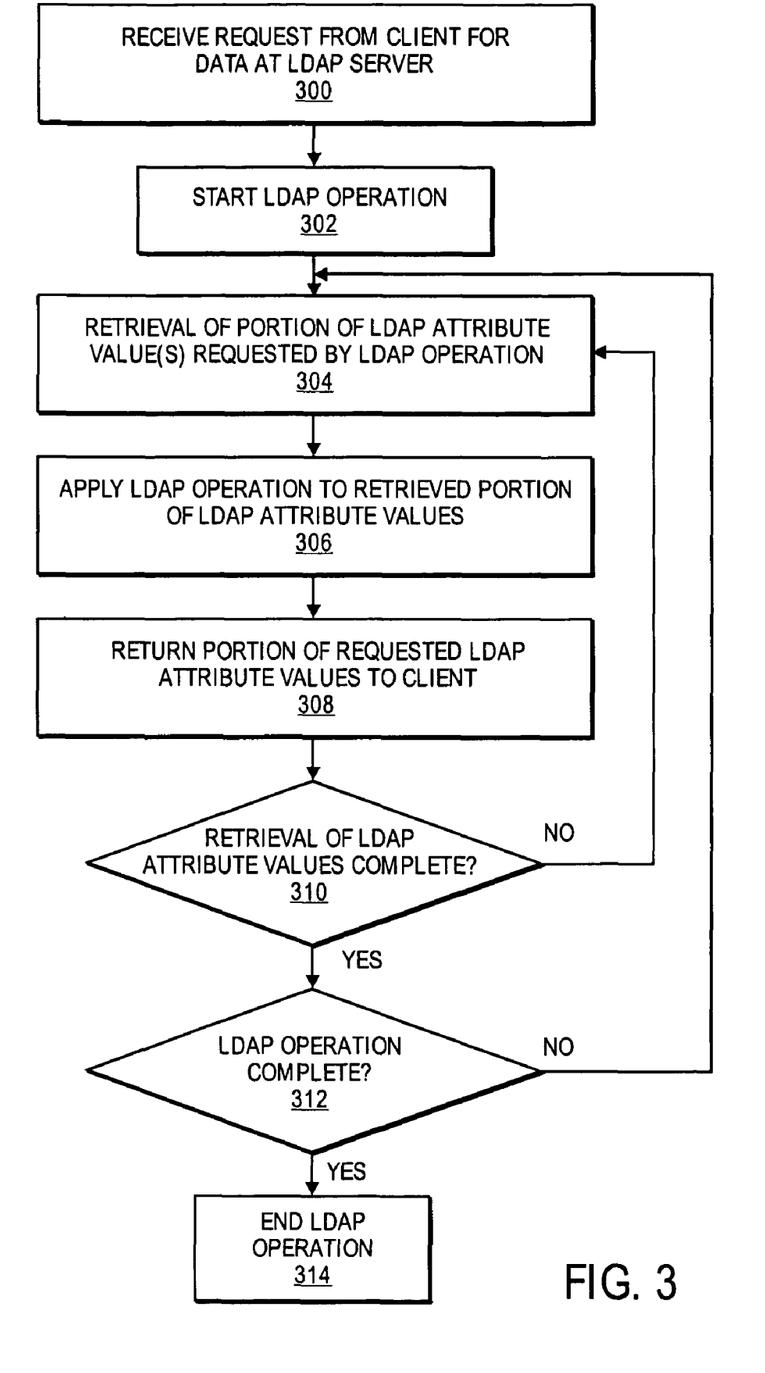
FIG. 3 is a flowchart of one embodiment of a process for servicing requests by an LDAP server.

FIG. 3 is a flowchart of one embodiment of the process of streaming an attribute from the LDAP repository. In one embodiment, a request may be received from a client or application server for data at the LDAP server (block 300). The request may initiate an LDAP operation to service the request (block 302). LDAP operations may include search, compare, update or any extended operation. The LDAP operation may access or retrieve attribute values from the LDAP repository to service the request from the client or application server. The attributes whose values should be retrieved may be determined by the generation of a candidate list or directly specified by the LDAP operation.

In the case where the attribute whose values are to be retrieved is streamable, the LDAP operation starts the retrieval of the attribute values by retrieving a portion of the total number of the LDAP attribute values in the corresponding LDAP entry (block 304). The number of attribute values to retrieve may be set in the streaming configuration data or may be determined by a user parameter, default value or similar mechanism. The order in which the attribute values are retrieved may be determined by the order of the attribute values in the LDAP repository, a user or operation parameter, streaming configuration data or similar mechanism.

As each portion of the LDAP attribute values is retrieved, the LDAP operation may be applied to the retrieved data (block 306). The results of the LDAP operation may then be prepared to be transmitted over the network to the client or application server (block 308). The method of transmission, including the protocol, window size, packet size and similar characteristics of the communication with the client or application server may be determined by the client or application server, negotiated between the client or application server and the LDAP server, specified at least partially by the streaming configuration data or similarly determined.

A check may be made after the retrieval of each portion of the LDAP attribute values to determined if all of the attribute values have been successfully retrieved (block 310). If there are additional attribute values, then the process of retrieval continues and the next portion of the attribute values is retrieved (block 304). If the requisite attribute values have been retrieved then a check may be made if the LDAP operation has completed (block 312). An LDAP operation may require the retrieval of values of multiple attributes. If the LDAP operation requires that values of multiple attributes be retrieved, then the process may continue with the retrieval of a portion of the attribute values of the next attribute (block 304). If all of the LDAP attribute values have been retrieved to complete the LDAP operation, then the LDAP operation may end (block 314).

Figure 4:
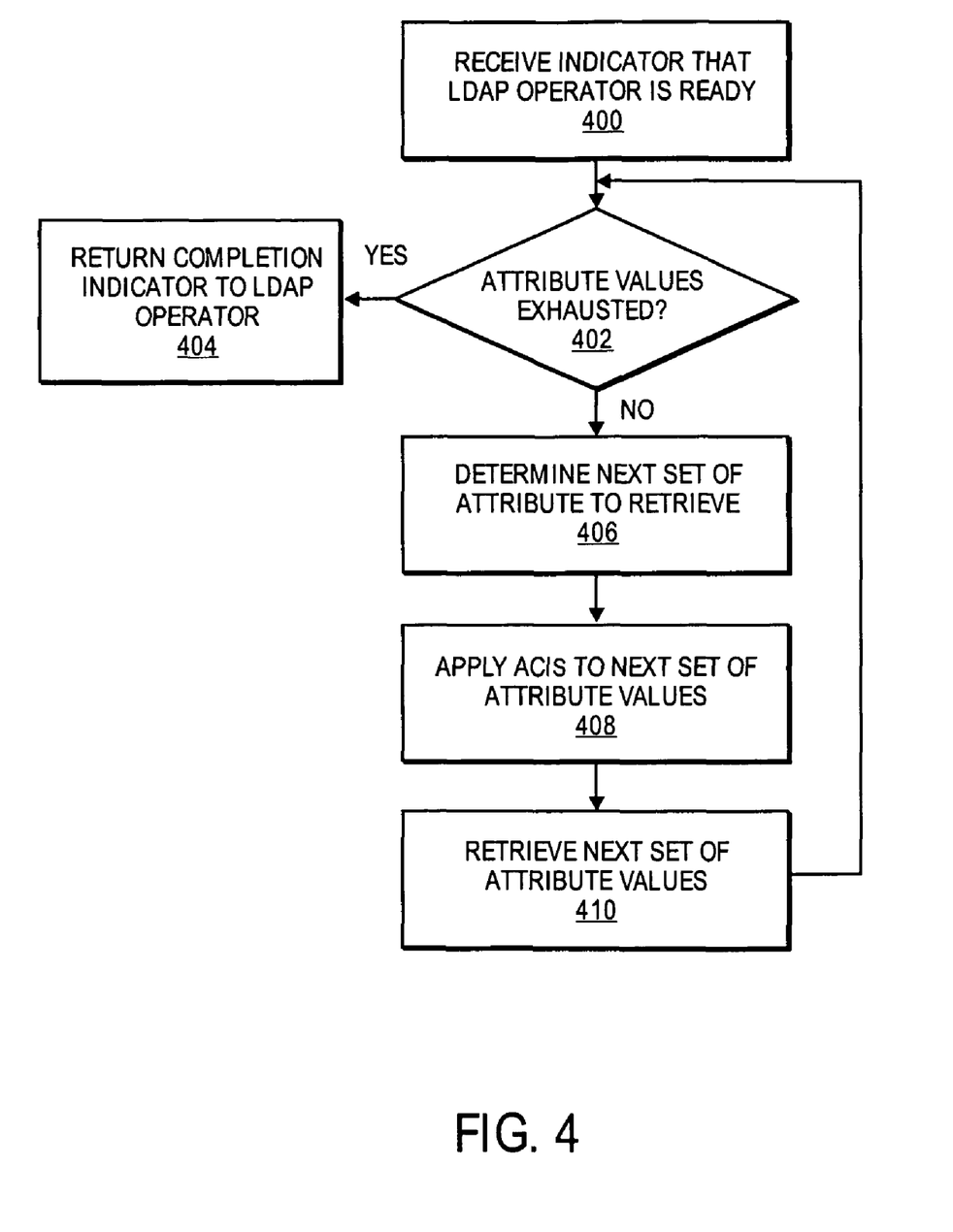
FIG. 4 is a flowchart of one embodiment of a process for streaming an attribute.

FIG. 4 is a diagram of one embodiment of the process of applying access control to the streaming of attributes. In one embodiment, the streaming of attribute values may be initiated by an LDAP operation or other process. The LDAP operation or similar process may be servicing a request from a client or application server. The streaming process may be handled by a streaming module or may be part of some other module within the LDAP server. The streaming module may receive an indicator that an LDAP process or operation is ready to receive attribute values from the LDAP repository and start the retrieval of the data in a data stream where the amount and rate that data is retrieved may be set or throttled by the streaming module. The streaming module may send a first set or attribute values to the LDAP operator in response to receiving an indicator that the LDAP operation is ready to receive attribute values. The set of values may be any size. The size or rate of retrieval may be determined by a system administrator and stored in the configuration data.

This process may begin with a check to determine if any attribute values for a requested attribute remain to be returned or if there were no attribute values associated with the attribute (block 402). If the attribute had no associated attribute values or all attribute values for a requested streamable attribute have been returned or exhausted, then a completion indicator may be returned to the LDAP operation (block 404).

If there are attribute values that have not yet been retrieved for the requesting LDAP operation, then the next set of attribute values to be retrieved are determined and and the access control instructions (ACIs) related to the entry and attribute are retrieved (block 406). The ACIs are then applied to determine if the LDAP operation can access the attribute values (block 408). If the conditions required by the ACIs are met, then the set of identified attribute values are retrieved and returned to the LDAP operation (block 410). If, however, the ACI conditions are not met then the identified attribute values are not retrieved and an error signal may be sent to the LDAP operation, the method may continue to the next set of attribute values or similar actions may be taken.

Figure 5:
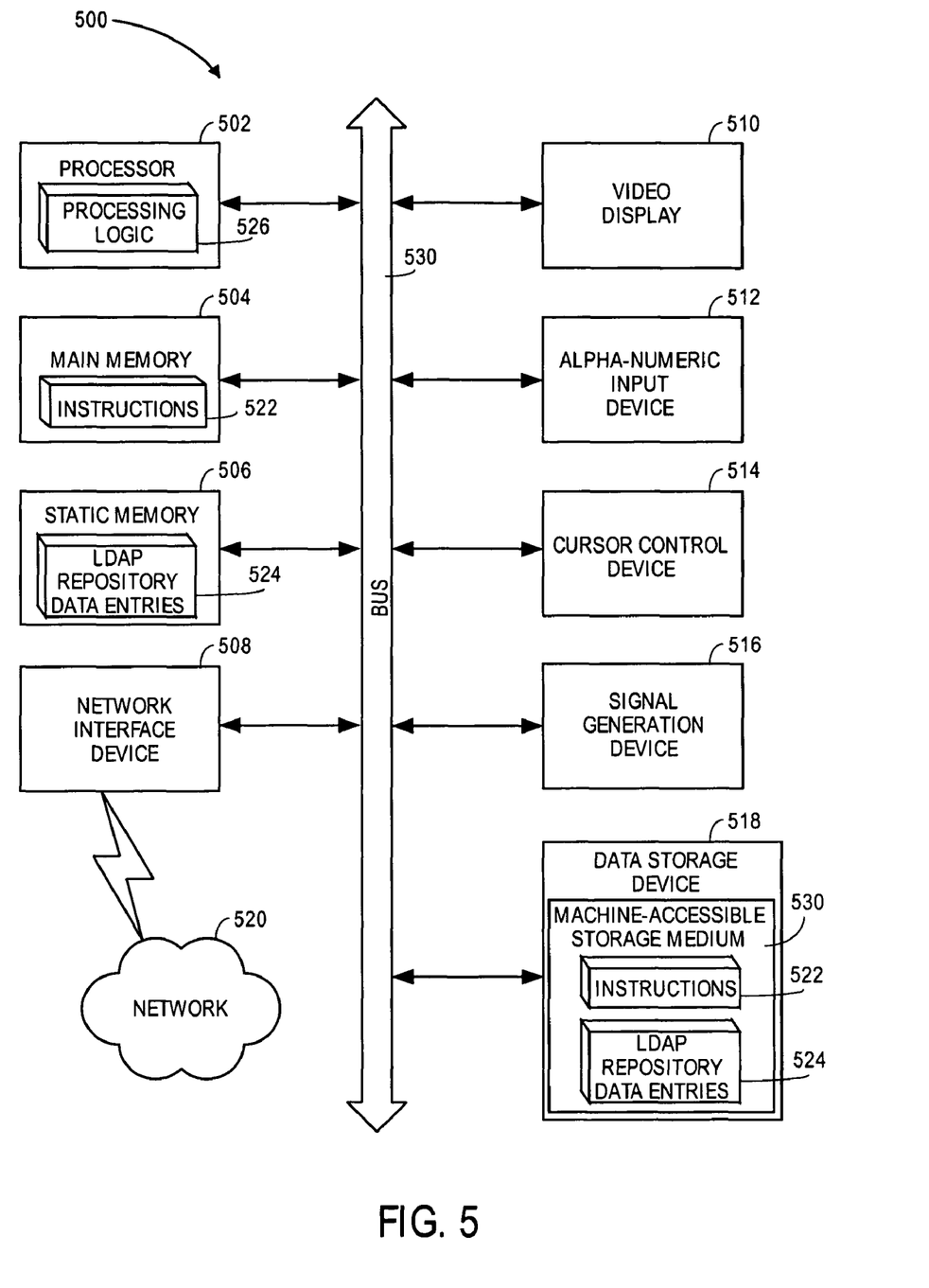
FIG. 5 is a diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet or the Internet. The machine may operate in the capacity of a server or a client machine in client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 may represent one or more general-purpose processing devices such as a microprocessor, central processing unit or the like. More particularly, the processing device may be a complex instruction set computing (CISC) microprocessor, reduced instruction set computing (RISC) microprocessor, very long instruction word (VLIW) microprocessor, or processor implementing other instruction sets or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 600, the main memory 504 and the processing device 502 also constituting machine-accessible storage media. The software 522 may further be transmitted or received over a network 520 via the network interface device 508.

The machine-accessible storage medium 530 may also be used to store LDAP repository data entries 524. LDAP repository data entries 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Thus, a method and apparatus for streaming attributes in response to LDAP requests have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of streaming LDAP attributes comprising:
receiving, by an LDAP server, a request for data included in a lightweight directory access protocol (LDAP) attribute, the LDAP attribute having a plurality of LDAP attribute values;
determining, by the LDAP server, whether the LDAP attribute is streamable;
when the LDAP attribute is streamable, retrieving, by a streaming module operating on the LDAP server, a stream of LDAP attribute values from an LDAP repository in response to the LDAP server initiating an LDAP operation, including retrieving a first subset of the plurality of LDAP attribute values serially at a rate at which the LDAP server is able to process the attribute values;
applying the LDAP operation to the first subset of the plurality of LDAP attribute values before retrieving a second subset of the plurality of attribute values, wherein the first subset and the second subset each include more than one LDAP attribute value; and
returning the first subset of the plurality of LDAP attribute values to a requester.

2. The method of claim 1, further comprising:
retrieving the second subset of the plurality of attribute values.

3. The method of claim 1, further comprising:
returning the first subset to the requester in a packet.

4. The method of claim 1, wherein the LDAP attribute is in one of a static group and a hybrid group.

5. The method of claim 1, wherein the request is for a plurality of attribute values.

6. The method of claim 1, further comprising:
retrieving each subset of the plurality of LDAP attribute values serially.

7. The method of claim 1, further comprising:
checking a configuration setting to determine LDAP packet size.

8. The method of claim 1, further comprising:
generating a candidate list based on the request.

9. The method of claim 1, further comprising:
applying an access control list to each subset of LDAP attribute values as they are retrieved.

10. A machine-accessible storage medium including data that, when accessed by a machine, cause the machine to perform a method of streaming LDAP attributes comprising:
receiving, by an LDAP server, a request for data included in a lightweight directory access protocol (LDAP) attribute, the LDAP attribute having a plurality of LDAP attribute values;

determining, by the LDAP server, whether the LDAP attribute is streamable;

when the LDAP attribute is streamable, retrieving, by a straming module operating on the LDAP server, a stream of LDAP attribute values from an LDAP repository by the streaming module in response to the LDAP server initiating an LDAP operation, including retrieving a first subset of the plurality of LDAP attribute values serially at a rate at which the LDAP server is able to process the attribute values;

applying the LDAP operation to the first subset of the plurality of LDAP attribute values before retrieving a second subset of the plurality of attribute values, wherein the first subset and the second subset each include more than one LDAP attribute value; and returning the first subset of the plurality of LDAP attribute values to a requester.

11. The machine-accessible storage medium of claim 10, the method further comprising:

retrieving a second subset of the plurality of attribute values.

12. The machine-accessible storage medium of claim 10, the method further comprising:

returning the first subset to the requester in a packet.

13. The machine-accessible storage medium of claim 10, the method further comprising:

retrieving each subset of the plurality of LDAP attribute values serially.

14. The machine-accessible storage medium of claim 10, the method further comprising:

applying an access control list to each subset of LDAP attribute values as they are retrieved.

15. The method of claim 1, wherein the LDAP attribute is streamable if it is associated with a streamable attribute indicator that identifies the LDAP attribute as being streamable.

16. The method of claim 1, further comprising:

applying the LDAP operation to the first subset of LDAP attribute values serially as the stream of LDAP attribute values is received.

17. The method of claim 1, wherein the first subset is returned to the requestor upon the LDAP operation being applied to the first subset.

18. The method of claim 1, further comprising:

determining the rate at which the LDAP server can process the LDAP attributes.

19. The machine-accessible storage medium of claim 10, the method further comprising:

determining the rate at which the LDAP server can process the LDAP attributes.

* * * * *